United States Patent [19]

Fekete et al.

[11] Patent Number: 4,614,305
[45] Date of Patent: Sep. 30, 1986

[54] APPARATUS FOR CONTROLLING AND INDICATING SPEED AND LOAD OF MOBILE CHOPPING MACHINE

[75] Inventors: András Fekete, Budapest; László Seres, Gödöllo; István Földesi; Vazul Rusz, both of Budapest, all of Hungary

[73] Assignee: MEM Muszaki Intezet, Tessedik, Hungary

[21] Appl. No.: 703,826

[22] Filed: Feb. 21, 1985

[30] Foreign Application Priority Data

Feb. 24, 1984 [HU] Hungary ................................ 743/84

[51] Int. Cl.$^4$ ............................................. B02C 25/00
[52] U.S. Cl. .................................. 241/36; 241/101.2; 241/101.7
[58] Field of Search ...................... 56/DIG. 15, 10.2; 241/30, 32, 33, 34, 35, 36, 101.2, 101.7

[56] References Cited

U.S. PATENT DOCUMENTS 3,606,742 9/1971 Wieneke et al. ................... 56/10.2

Primary Examiner—Mark Rosenbaum
Attorney, Agent, or Firm—Mandeville and Schweitzer

[57] ABSTRACT

An apparatus for indicating and controlling the vehicle speed and load of a mobile foliage chopping machine. As rotational speed of the chopping drum increases over its permissible minimum, a vehicle increasing speed control is carried out. Correspondingly, a decrease in speed due to increase in the working load of the chopping drum is compensated by a reduction of gear transmission of the driving machinery. Thus, the adjusted speed is held but in case of chopping drum overload, when rotational speed of the drum starts to fall below the permissible minimum, the vehicle speed control is discontinued, i.e., a speed decreasing intervention is done, therefore the permissible working load of chopping machine is held, while overload is avoided.

4 Claims, 5 Drawing Figures

APPARATUS FOR CONTROLLING AND INDICATING SPEED AND LOAD OF MOBILE CHOPPING MACHINE

BACKGROUND OF THE INVENTION AND DESCRIPTION OF THE PRIOR ART

The invention relates to a process for indicating and controlling speed and load of mobile chopping machines and an apparatus for realizing this process.

Mobile chopping machines are used for cutting and chopping or picking-up and chopping of plants—rough fodder, corn, etc.—as well as for blowing them into a transport vehicle or for their continuous or periodical transfer. To take in crops at the optimal time within the shortest period, manufacturers increase the output of the engines and the capacity of the machines. It seens to be very important to use the capacity of the given construction in full degree, but at the same time to ensure the required working quality and technological working safety, as well as to blow the crops at a minimal waste into the transport vehicle, whereas these result in a decline of the specific use of energy.

Drivers of up-to-date automotive engines try to carry out this task in such a manner, that on one hand the driver watches plant-stock before the machine and tries to adjust the speed according to the expected load on the basis of the plant-stock's yield and its condition. On the other hand the driver watches the tachometer as well, and when the rotational speed of the chopping drum falls, he slows down the machine, thereby reduces the load and prevents the machine from clogging, which can be obviated only in lost time.

Up-to-date mobile chopping machines—including automotive machines—have not any automatic device securing their working with the required optimal load and preventing from overload, or from clogging or fall of rotational speed of the chopping drum as a result of overload. Due to different construction and function of chopping machines and combines the load control worked out for combines and solutions known from patent specifications relating to this matter (e.g. DE-OS No. 2 106 970, DE-OS No. 2 200 133, DE-PS No. 1 265 476 and U.S. Pat. No. 3,606,742) cannot be adopted to chopping machines, as several tasks should be simultaneously solved for their suitable and economical working, such as to ensure the maximal turning-out or working load, to prevent the chopping drum from the extreme fall of rotational speed (to avoid the increasing length of chaffs and the fall of working quality), to drive the machine at a steady or roughly steady speed (to blow the crop into a transport vehicle or transfer it at a reduced waste), to ensure the minimal specific use of fuel, to prevent the machine from clogging.

A driver can carry out the above tasks in dependence of his tiredness, skill and economical interest at a rather different range. That is why it is very important to carry out these tasks with automatization. Till now we have not any such automatization before which would carry out these—in some respect totally opposite tasks, such as maximal output, optimal drum rotational speed, steady speed and minimal specific use of fuel.

Looking at the characteristic diagram of an up-to-date Diesel engine (see FIG. 1) it turns out that engine of chopping machine gives maximal output at a minimal specific use of fuel, when it works with full charge in a scale of rotational speed between $n_2$ and $n_3$—which is the optimal working factor. In case of given engine-type and chopping machine, rotational speed $n_2$ and $n_3$ should be determined in such a way that sufficient momentum and reserve range of rotation should be applicable to overcome sudden load increase.

The rotational speed of the chopping drum belonging to the value of $n_2$ of the engine is a so-called permissible minimal chopping drum speed.

The GB-PS No. 1 605 036—the nearest solution to our invention, described an equipment, where the harvesting machine has a rotation sensor connected to the harvesting device of the machine and a moving-speed sensor, and the automatic speed change is directed to difference reduction of signals given by the two sensors.

In known chopping machines beside a moving speed sensor a rotation sensor can be found as well connected e.g. to the driving machinery of the gathering unit. This equipment could be suitable for avoiding the overload of a chopping machine but because of the permanent speed change it cannot ensure that at the permissible or acceptable degree of load the chopping machine moves with the adjusted speed, therefore it makes the transport vehicle difficult to move with chopping machine together, so crop waste during the blowing into the transport vehicle increases.

The aim of the invention is to develop a process and an apparatus, which ensures optimal utilization of capacity of a mobile chopping machine and prevention from overload, operation of said machine with approximately steady speed, minimal crop waste during blowing and transfer and prevention from clogging.

Solution according to our invention is based on that recognition that speed and working load of chopping machine can be controlled advantageously on the basis of at least two parameters—suitably speed and rotational speed of the chopping drum—or of three parameters—speed, rotational speed of the chopping drum and momentum of driving machinery of units before the chopping drum—in such a way, that, when rotational speed of the chopping drum increases over its permissible minimum, a speed control is carried out—speed fall due to increase in working load is compensated by a reduction of gear transmission of driving machinery—accordingly the adjusted speed is held but in case of overload, when rotation of the drum falls below the permissible minimum, and/or momentum of driving machinery of units before the chopping drum increases over the adjusted maximum, speed control is discontinued, i.e. a speed decreasing intervention is done, therefore the permissible working load of chopping machine is held, while overload is detained.

BRIEF DESCRIPTION OF THE DRAWINGS

Solutions both known and the one according to our invention are set forth referring to the following drawings, wherein.

DETAILED DESCRIPTION OF THE INVENTION

Process according to the invention serves for the purpose of indicating and controlling speed and load of mobile chopping machine, where during its working the speed of chopping machine and rotational speed of the chopping drum is observed. This process operates in such a way, that when the speed of the chopping drum increases over the permissible minimum, and speed falls below the adjusted volume, then we increase the speed of the chopping machine up to the adjusted volume. And when, however speed of the chopping drum falls below the permissible minimum, the speed of chopping machine is decreased in such a way, that rotational speed of the chopping drum increases over the permissible minimum, while operation of units connected to speed sensor is disallowed with the aid of a guided switching system.

In a preferred realization of the invention, while operating the machine, speed of the machine, rotational speed of the chopping drum and momentum of driving machinery of units before the chopping drum is observed, and when the speed of chopping drum increases over the permissible minimum and/or the momentum of driving machinery of units before the chopping drum does not get over the adjusted maximum, then when speed of the chopping machine falls below the adjusted volume we increase it up to the adjusted volume. Should the speed of chopping drum fall below the permissible minimum and/or the momentum of driving machinery of units before the drum increases over the adjusted maximum, speed of the chopping drum is decreased in such a way, that it increases over the permissible minimum and/or momentum of the driving machinery of units before the chopping drum falls below the adjusted maximum.

Figure 1:
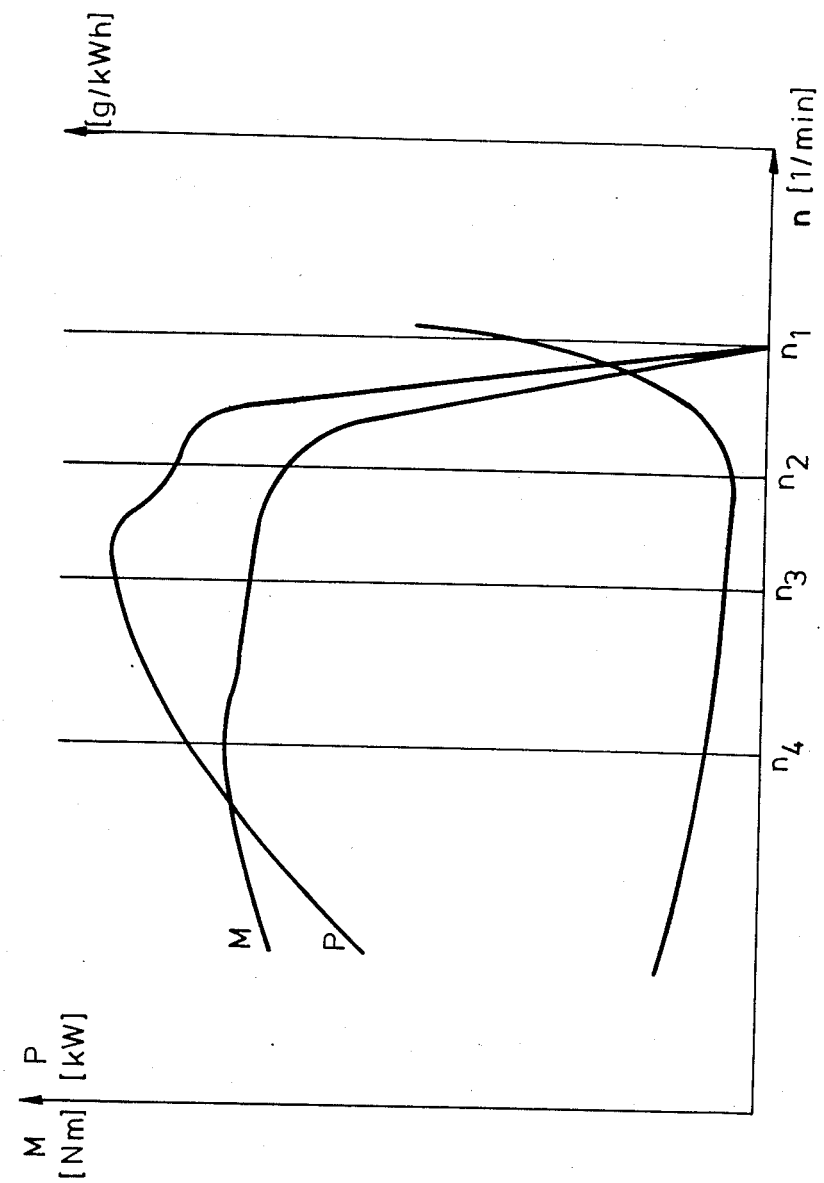
FIG. 1 is a characteristic diagramm of a Diesel-engine.
Figure 2:
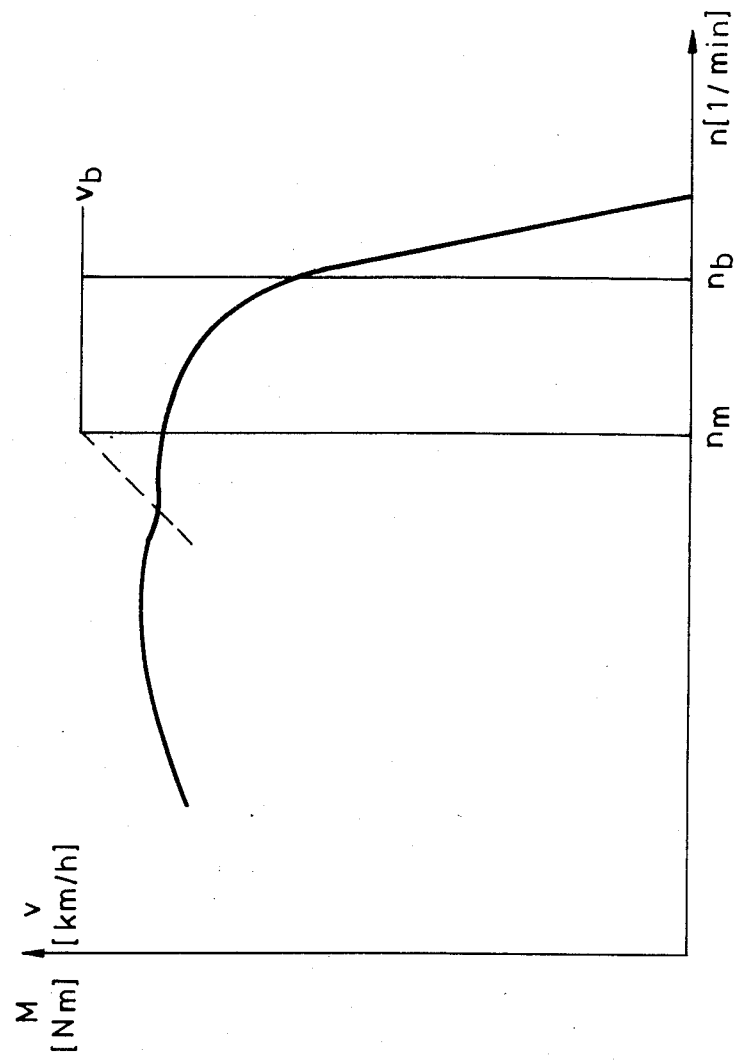
FIG. 2 shows the speed of a chopping machine and momentum of its engine plotted against rotational speed of chopping drum.

The process according to the invention is described in more details with reference to FIG. 2.

During operation of chopping machine, first adjustment is carried out, i.e. we adjust the required speed $v_b$ of the machine to the rotational speed $n_b$ of the drum depending on load and speed of the machine. This adjustment keeps the adjusted speed $v_b$ until rotational speed n of the drum falls below the permissible minimal rotational speed $n_m$ of the drum. However, decrease of rotational speed n below the permissible minimal rotational speed $n_m$ results in a speed decrease, so in the range $n<n_m$ of the operation at the adjusted steady speed is ensured, while in the range $n>n_m$ a speed decrease is done which eliminates overload.

Figure 3:
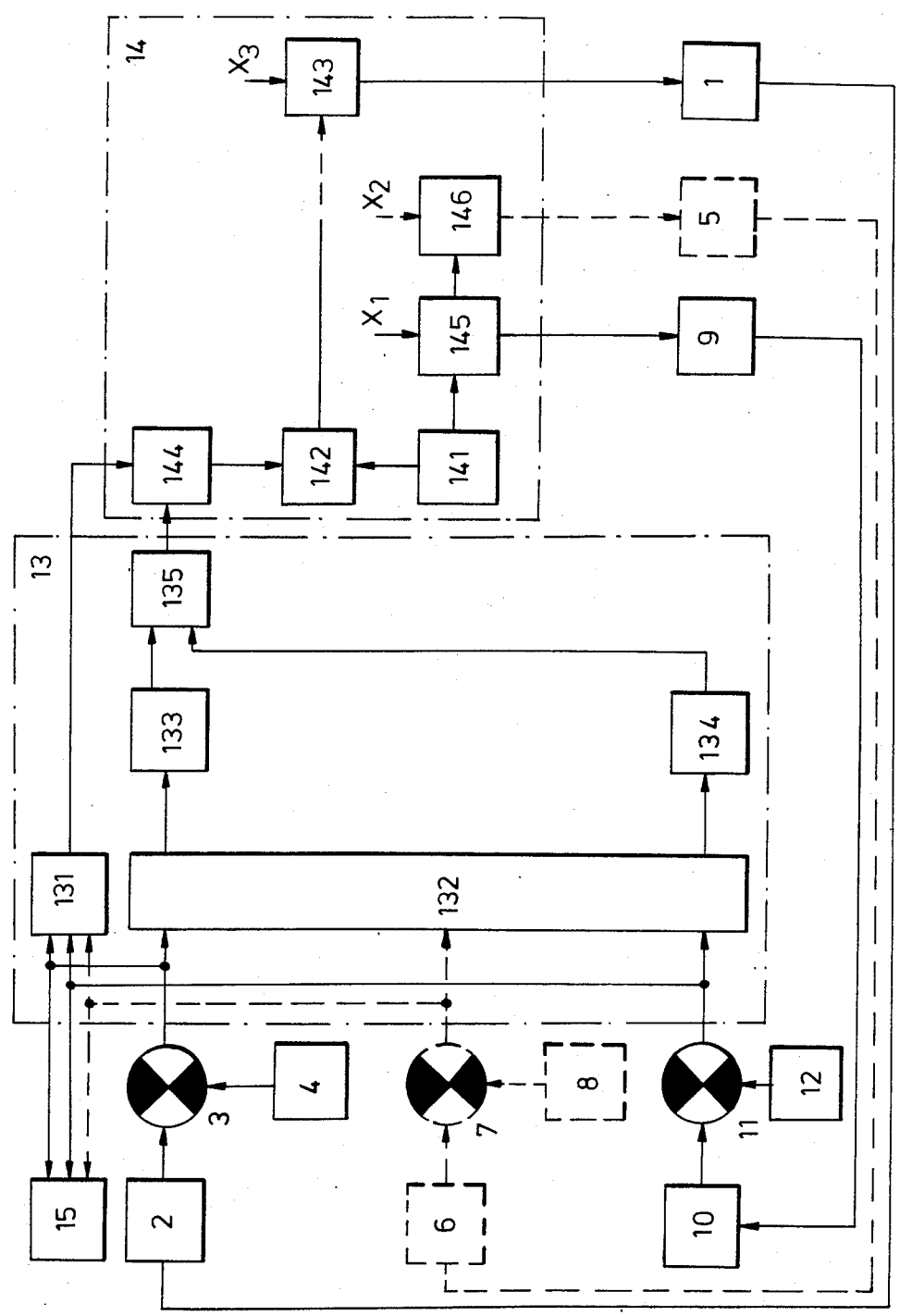
FIG. 3 is a block-diagram of the apparatus according to the invention.

Block-diagram of the apparatus according to the invention can be seen in FIG. 3, where one output of its Diesel-engine 141 is connected to one input of hydrostatic driving unit 142 and its other output is connected to one input of chopping drum 145, while another input of the hydrostatic driving unit 142 is coupled to an output of transmission changing intervention unit 144 and an output of hydrostatic driving unit 142 is connected to an input of a non-driven wheel 143.

The output of the non-driven wheel 143 is connected to an input of a speed sensor 1, one output of chopping drum 145 is coupled to an input of a rotation sensor 9, while its other output is connected to an input of a driving device 146. It is characteristic of the apparatus that an output of the speed sensor 1 is connected to an input of a first signal former 2, and an output of first signal former 2 is connected to one input of first subtractor 3, while the other input of the first subtractor 3 is connected to an output of first basic signal former 4. The output of a rotation sensor 9 is coupled to an input of a second signal former 10, the output of which is connected to one input of second subtractor 11, while other input of the second subtractor 11 is connected to an output of a second basic signal former 12. The output of the first subtractor 3 is connected to a first input of reverse signal former 131 of a guided switching system 132 of the compensation signal former 13 and a first input of a display 15, the output of second subtractor 11 is connected to second input of guided switching system 132, of reverse signal former 131 and of display 15. First output of the guided switching system 132 is connected to an input of speed decreasing generator 133, while its second output is coupled to an input of speed increasing generator 134, the output of speed decreasing generator 133 is connected to one input of intervention signal amplifier 135, output of speed increasing generator 134 is coupled to another input of intervention signal amplifier 135, the output of which is connected to one input of intervention unit 144, the output of reverse signal former 131 is connected to another input of the intervention unit 144.

Figure 4:
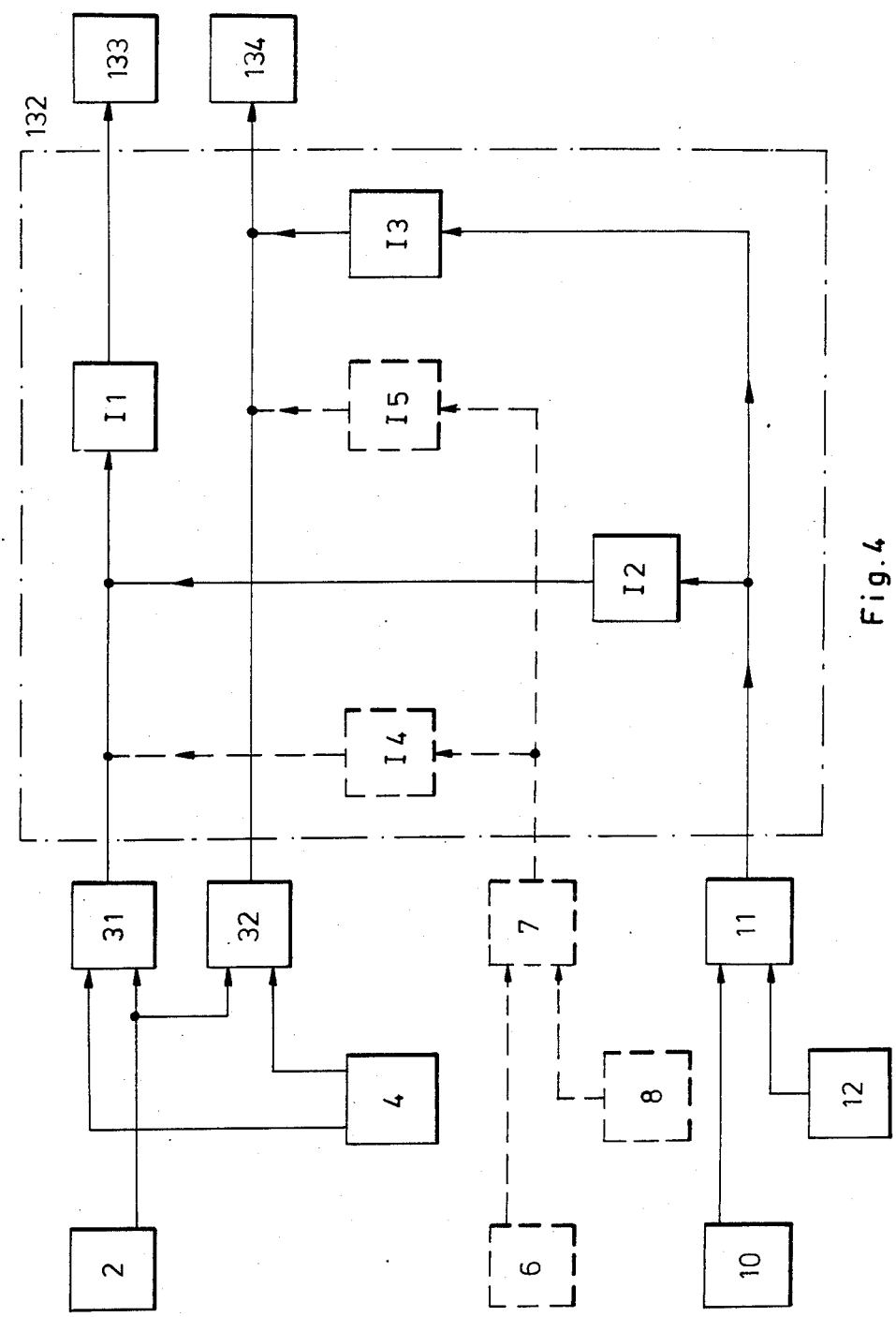
FIG. 4 is a preferred embodiment of the apparatus according to the invention.

It is characteristic of the preferred embodiment—described in FIG. 3 with dashed lines—of the apparatus according to the invention, that besides speed sensor 1 and rotation sensor 9 it contains a momentum sensor 5 having an input connected to the output of driving device 146 and an output connected to input of third signal former 6, output of which is connected to one input of subtractor 7, another input of third subtractor 7 is connected to output of third basic signal former 8, while output of said third subtractor 7 is connected to third input of display 15 and reverse signal former 131 of the guided switching system 132. $X_1$, $x_2$ and $x_3$ mean different disturbances arising during operation, e.g. undulation of ground. Operation of the apparatus according to the invention is disclosed with reference to FIG. 4, where preferred embodiments of first, second and third subtractor 3, 7 and 11, of the guided switching system 132, speed decreasing and speed increasing generators 133 and 134 of the apparatus can be seen.

From speed sensor 1, rotation sensor 9 and momentum sensor 5 signals get to first signal former 2, second signal former 10 and third signal former 6. Proportional to the speed signal from first signal former 2 gets to another input of first subtractor 3. First subtractor 3 consists of two comparators. One input of the first comparator 31 is connected to one output of the first basic signal former 4 and another input of second comparator 32 is coupled to another output of the first basic signal former 4. On the basic signal outputs of the first basic signal former 4 an adjustable voltage reference shifted from each-other can be produced.

When adjusted speed of the chopping machine 14 is higher than the speed adjusted by basic signal former 4, the output of first comparator 31 gets lower and through the first inverter I1 starts the speed decreasing generator 133, which preferably is an astable multivibrator.

Speed decrease as a result of the load of chopping machine 14 is observed by a second comparator 32 having an output connected directly to the input of speed increasing generator 134, which is an astable multivibrator as well. Speed decrease starts with getting this generator into work and through an intervention signal amplifier 135 the back-control starts itself.

Second and third subtractors 11 and 7 are comparators too.

If load gets higher and signal proportional to revolution getting from revolution sensor 9 to second subtractor 11 reaches signal adjusted on second basic signal former 12, then signal appearing on the output of second subtractor 11 prohibits the speed increasing generator 134 through third inverter 13 and it starts through second and first inverters 12 and 11 the speed decreasing generator 135 which results in a load decrease beside a speed decrease of the chopping machine 14 as well, in a result of which the signal on output of the second subtractor 11 tilts back and control gets passed to first and second 31, 32 comparators.

In that case, when the signal proportional to momentum getting from momentum sensor 5 to third subtractor 7 reaches the volume adjusted by third basic signal former 8, the control through fourth and fifth inverters 14, 15 connected to output of third subtractor 7 works in the same way as described in the above case of rotation decrease.

Figure 5:
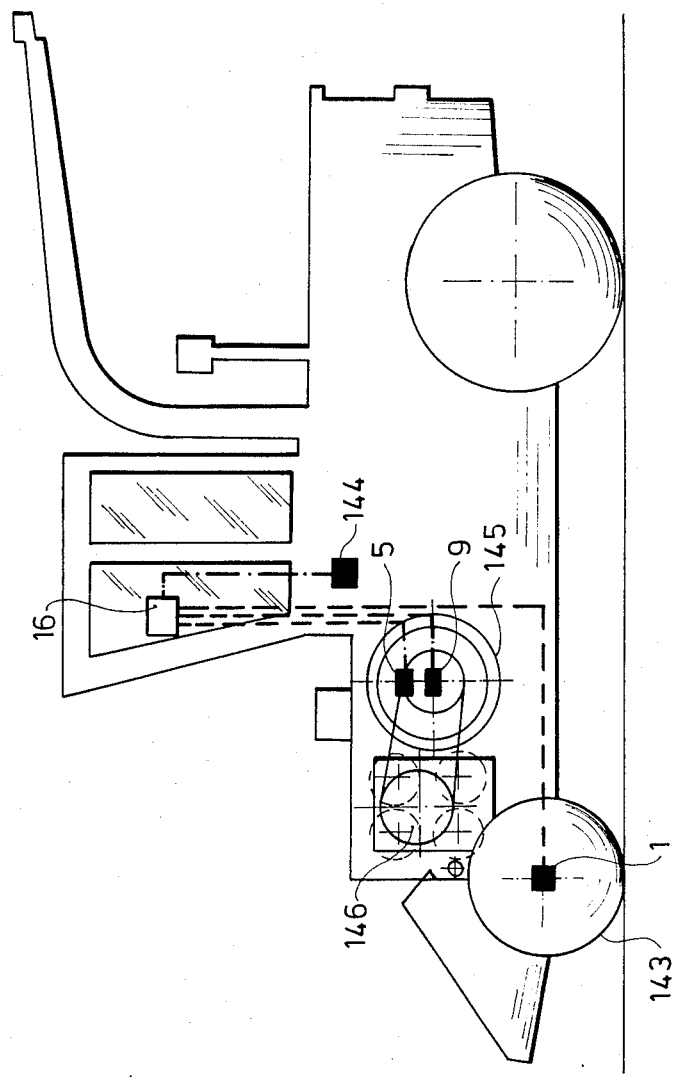
FIG. 5 illustrates displacement of the apparatus according to the invention in an automotive chopping machine.

In FIG. 5 displacing of the apparatus according to the invention in a mobile chopping machine can be seen, where speed sensor 1 of the non-driven wheel 143 is connected to central unit 16 displaced in the driver's cabine of the chopping machine. Rotation sensor 9 of chopping drum 145 and momentum sensor 5 of the driving machinery 146 of units before chopping drum 145 are connected also to central unit 16, which is in connection with intervention unit 144.

Set task is carried out by the process and apparatus according to the invention, as it makes a speed control in a range over the permissible and determined on the basis of technical characters of the chopper and its engine (flexibility of the engine, revolutional speed belonging to the maximum momentum) and it ensures working with the adjusted speed independently from changes in revolutional speed of the engine and "slip" of the driving wheels.

In a case of decrease in revolutional speed of the chopping drum below the permissible minimum and/or increase in momentum of driving machinery of units before the chopping drum over the adjusted maximum, a load control is done in such a way, that working with satisfactory load is ensured by a speed decrease.

What we claim is:

1. An apparatus for indicating and controlling the vehicle speed and working load of a mobile foliage chopping vehicle comprising a chopping machine vehicle having a Diesel-engine, the first output of said engine is connected to a first input of a hydrostatic driver, the second output of said engine being connected to an input of a chopping drum, the second input of the hydrostatic driver is coupled to the output of a transmission changing intervention unit, while the output of said hydrostatic driver is connected to the input of a non-driven wheel, the output of said non-driven wheel is connected to an input of a speed sensor, a first output of the chopping drum is coupled to the input of a chopping drum rotation speed sensor, an output of said speed sensor is connected to the input of a first signal former, the output of said first signal former is connected to a first input of a first subtractor, while a second input of said first subtractor is connected to the output of a first basic signal former, said first subtractor providing three outputs, the output of said chopping drum rotation speed sensor is connected to the input of a second signal former, while the output of said second signal former is connected to a first input of a second subtractor, the second input of said second subtractor is coupled to the output of a second basic signal former, said second subtractor also providing three outputs; said three outputs of said first subtractor are respectively connected to a first input of a reverse signal former, a first input of a guided switching system of a compensation signal former and to a first input of a display means, said three outputs of said second subtractor are connected respectively to the second input of said reverse signal former, the second input of said guided switching system and the second input of said display means, the first output of said guided switching system is connected to the input of a speed decreasing generator and the second output of said guided switching system is connected to the input of a speed increasing generator, the output of said speed decreasing generator is coupled to a first input of an intervention signal amplifier and the output of said speed increasing generator is connected to the second input of said intervention signal amplifier;

the output of said intervention signal amplifier is coupled to a first input of said transmission changing intervention unit, and the output of said reverse signal former provides the second input of said transmission changing intervention unit.

2. An apparatus as claimed in claim 1, further comprising:

said chopping drum also provides a second output which is an input to a vehicle driving unit, a momentum sensor is provided having as its input the output of said vehicle driving unit;

the output of said momentum sensor is connected to the input of a third signal former, the output of said third signal former is connected to a first input of a third subtractor having as a second input the output of a third basic signal former, said third subtractor having three outputs; the three outputs of said third subtractor are connected respectively to the third input of said guided switching system; the third input of said reverse signal former and to said display means.

3. An apparatus as claimed in claim 2, further comprising:

said first subtractor consists of a first and a second comparator with the first input of said first and second comparators connected to the output of said first basic signal former while the second input of said first and second comparators is connected to the outputs of said first signal former, the output of said first comparator is connected as a first input to a first inverter which provides the input of said speed decreasing generator; the output of said second comparator is connected to the input of said speed increasing generator; said second subtractor is a third comparator having an output connected to the input of a second and a third inverter;

the output of said second inverter being coupled to the second input of said first inverter, the output of said third inverter being connected to the input of said speed increasing generator, and said third subtractor is a fourth comparator having outputs connected as the inputs of a fourth and a fifth inverter, the output of said fourth inverter is a third input of said first inverter and the output of said fifth inverter is another input of said speed increasing generator.

4. An apparatus as claimed in claim 1, further comprising:

said first subtractor consists of a first and a second comparator with the first input of said first and second comparators connected to the output of said first basic signal former while the second input of said first and second comparators is connected to the outputs of said first signal former, the output of said first comparator is connected as a first input to a first inverter which provides the input of said speed decreasing generator;

the output of said second comparator is connected to the input of said speed increasing generator; said second subtractor is a third comparator having an output connected to the input of a second and a third inverter;

the output of said second inverter being coupled to the second input of said first inverter, the output of said third inverter being connected to the input of said speed increasing generator.

* * * * *